Patented Jan. 23, 1940

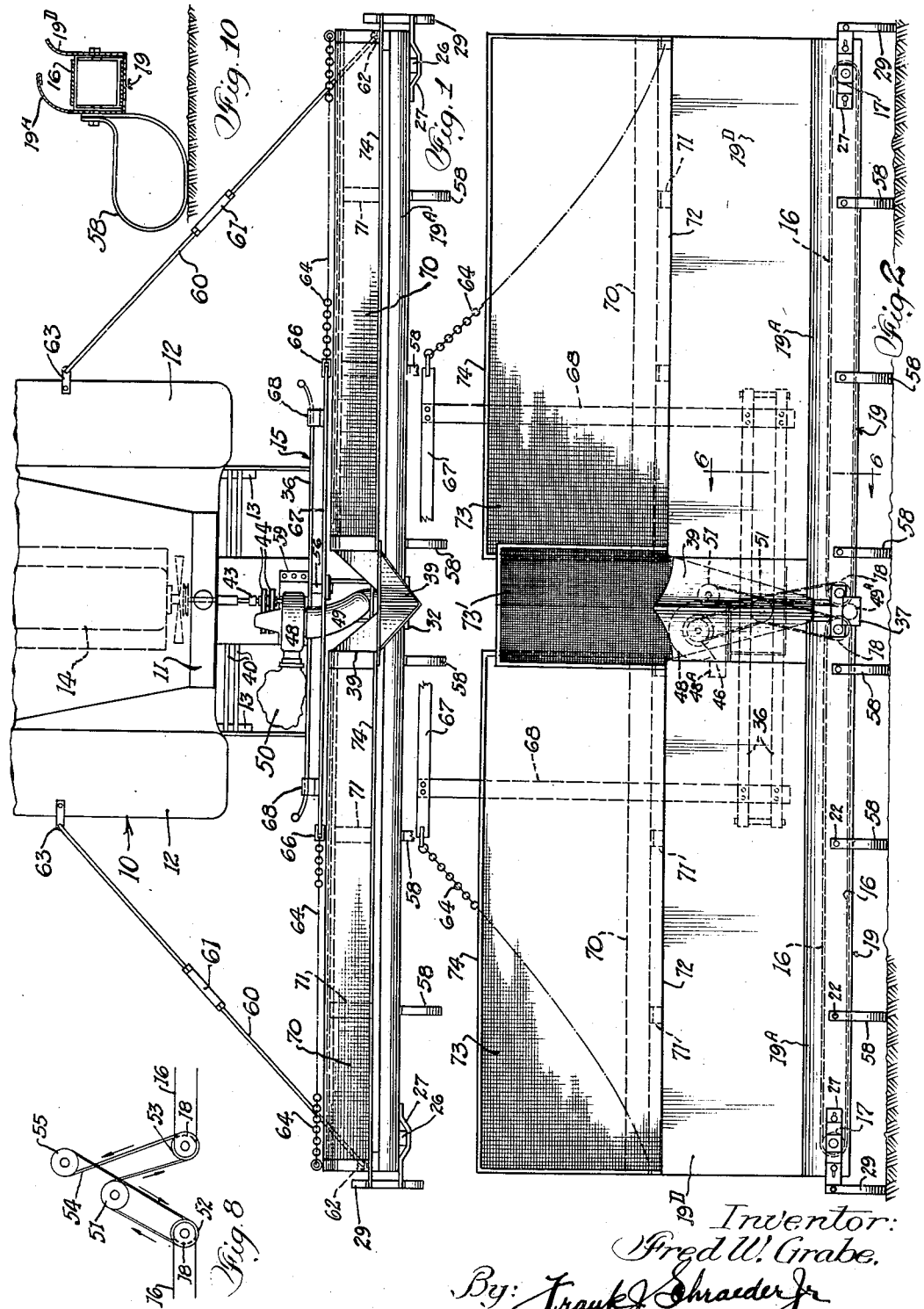

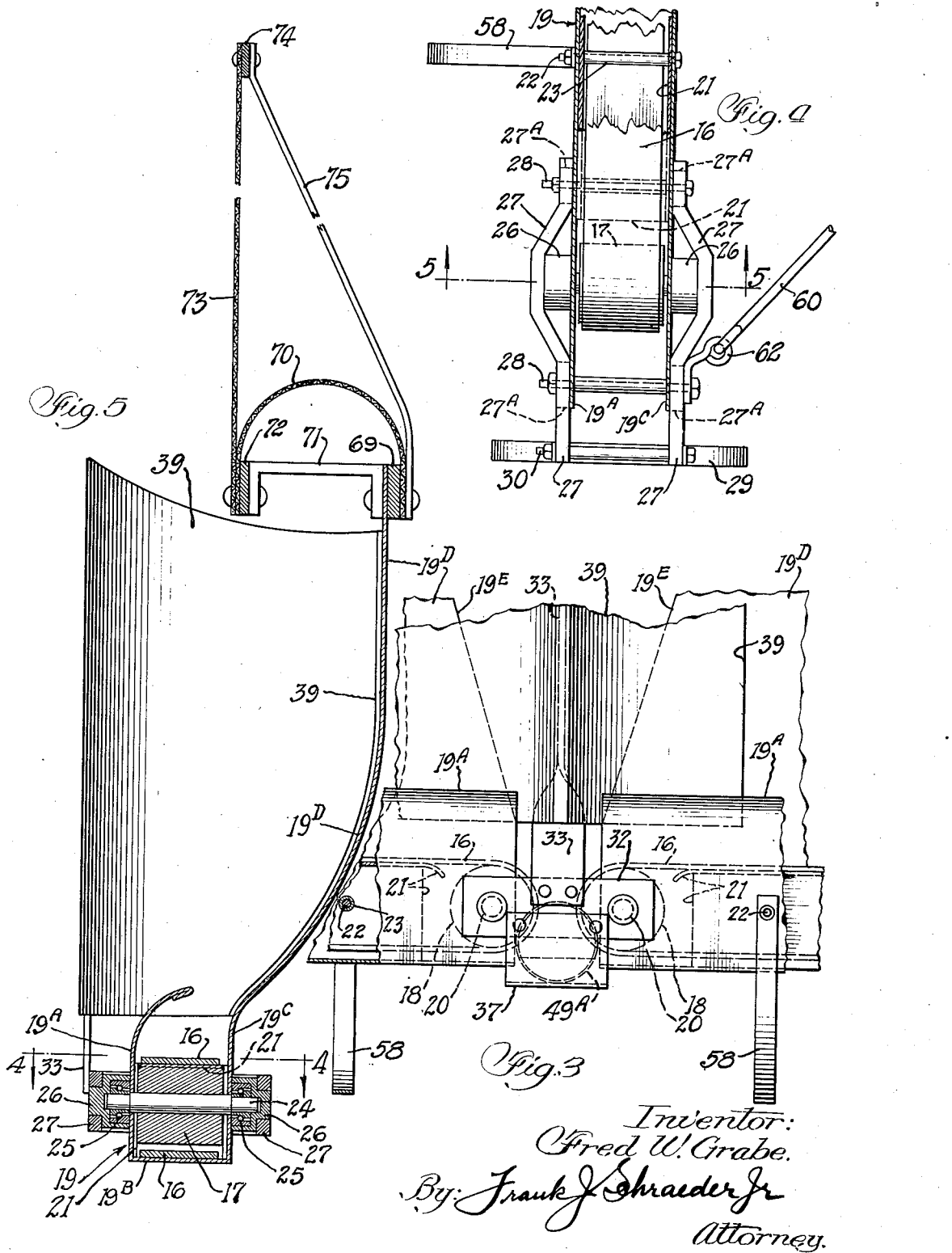

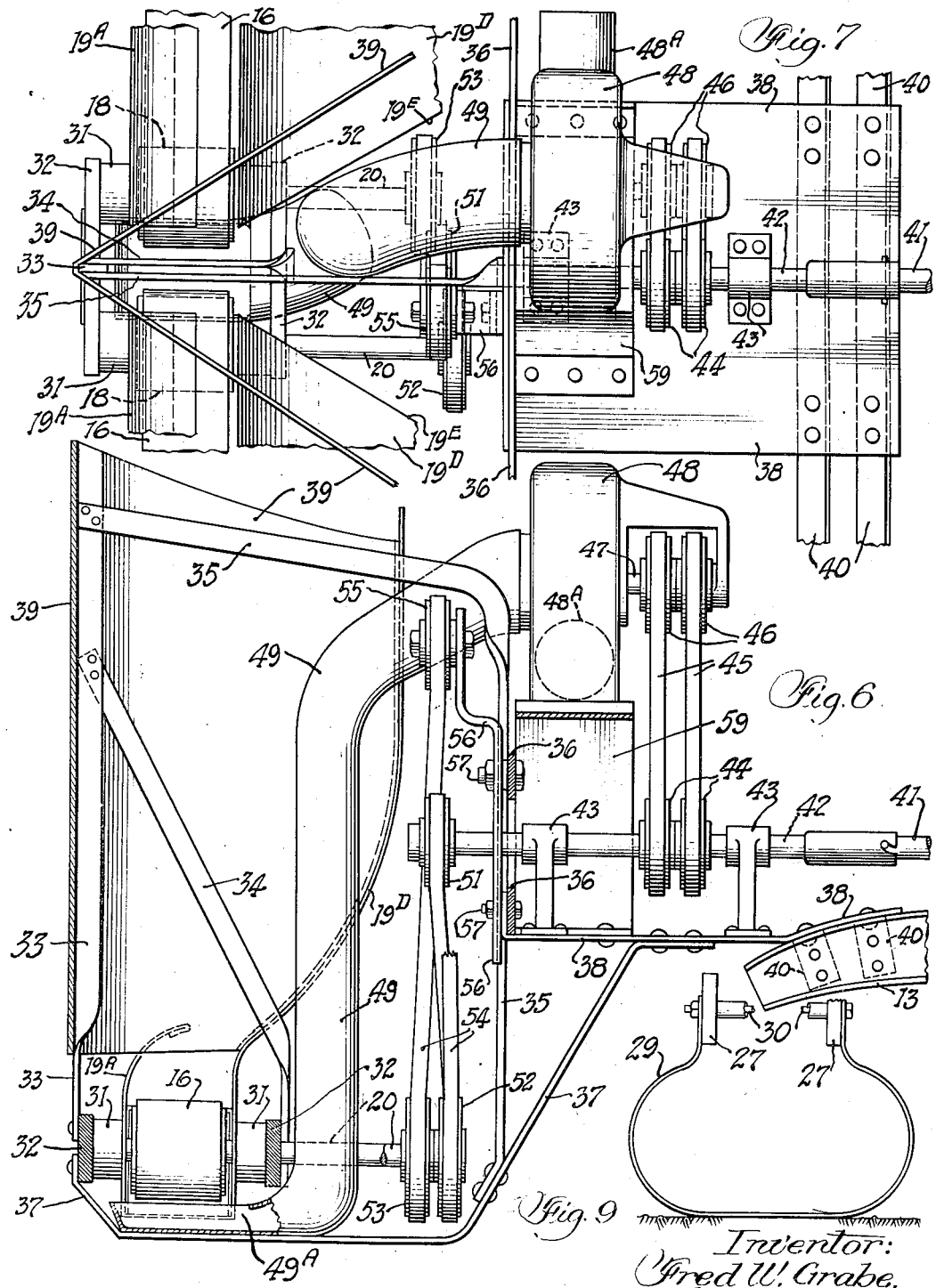

2,188,094

UNITED STATES PATENT OFFICE 2,188,094

INSECT CATCHING APPARATUS

Fred W. Grabe, South Omaha, Nebr.

Application November 15, 1937, Serial No. 174,510

8 Claims. (Cl. 43—140)

This invention relates to new and useful improvements in insect catching apparatus of the motorized type and has among its objects to provide motorized apparatus which may be readily propelled over fields or farm land to engage, trap and bag winged insects of various kinds, such as grasshoppers.

Another object of the invention resides in the provision of a motor-propelled winged-insect catcher including a laterally disposed wall for engaging the winged insects in their flight and directing them into a conveyor trough or preferably into a pair of troughs equipped with oppositely moving conveyors for conveying the trapped insects into a suction chamber of a suction pipe disposed between the adjacent ends of the conveyors and operatively connected to a suction fan whereby the insects are drawn by suction into a suitable receiver such as a fabric bag.

Another object of my invention is found in the provision of insect-catching apparatus which is adapted to be attached to the front end of an automobile in such manner that the conveyors and suction apparatus are propelled by the automobile engine while the automobile is driven over the field.

A still further object is to so construct and support the insect-catching conveyors and their insect engaging walls that sufficient flexibility is provided for permitting relative movement between the two conveyor sections when the apparatus is moved over irregular or uneven ground surfaces.

With the above and other objects in view, my invention consists in the novel combination and construction of the parts and members shown in the preferred embodiment in the attached drawings, described in the following specifications and particularly pointed out in the appended claims.

Referring to the drawings:

Fig. 1 is a plan view of the forward end of an automobile having attached thereto insect-catching apparatus embodying my invention;

Fig. 2 is a front elevation of same;

Fig. 3 is an enlarged front elevation of the discharge end of the conveyors;

Fig. 4 is an enlarged sectional plan view of the outer end of one of the conveyors taken on line 4—4 of Fig. 5;

Fig. 5 is an enlarged vertical section taken on line 5—5 of Fig. 4;

Fig. 6 is an enlarged vertical section taken on line 6—6 of Fig. 2, showing the power transmission mechanism;

Fig. 7 is a plan view of the mechanism shown in Figs. 1, 2 and 6;

Fig. 8 is a diagram of the conveyor belt drive;

Fig. 9 is an end view of the supporting shoe, and

Fig. 10 is a cross-section through the conveyor trough showing one of the agitators.

The insect catching and gathering apparatus may obviously be provided with any suitably powered frame or motor-driven vehicle. I have preferred to show its adaptation to the front end 10 of an automobile partly shown in Fig. 1 in which numeral 11 indicates the radiator, 12 the front fenders, 13 the steel longitudinal frames of the chassis, 14 the automobile motor, and 15 the front bumper.

The insect catching, gathering and captivating apparatus includes a pair of belt conveyors 16, the upper runs of the belts being arranged to move toward the center of the apparatus. Each of the belts 16 is trained over end rollers 17 and central or discharge end rollers 18.

Each of the belt conveyors is mounted within a metal trough generally indicated by 19 and consisting of a vertical front side plate 19$^A$ the upper end of which is bent angularly to extend over the top of the conveyor, a bottom plate 19$^B$, and a rear side plate 19$^C$ having an extension 19$^D$ curved upwardly and extended vertically. The troughs extend longitudinally toward one another to a spaced distance apart at points slightly beyond the shafts 20 of the belt discharge end rollers 18, and the upper wall portions 19$^D$ of the rear wall are cut at an angle outwardly at the center of the apparatus, as at 19$^E$, to permit relative angular movements of the troughs and the conveyors about their pivotal supports on the conveyor drive shafts 20 to accommodate the adjustment of the apparatus as it slides over slightly undulating ground formations.

The upper rim of each belt 16 is supported on the flat portion of plate 21 of inverted U-cross-section which extends between and to within proximity of the rollers 17 and 18 and the vertical side portions of the plate lie adjacent the inside faces of the trough plates 19$^A$ and 19$^C$ to thereby reinforce the trough.

The lower run of each conveyor belt 16 is free to slide on the bottom plate 19$^B$.

The trough sides are additionally reinforced by suitable spaced bolts 22 and pipe separators 23 which extend between the vertical sides of the plate 21, as shown in Fig. 4.

The end rollers 17, as shown in Figs. 4 and 5, are rigidly fixed to spindles 24 which are supported on ball bearings 25 in housings 26 mounted on bars 27. The bars 27 are secured to the trough side plates by bolts 28 and the bars 27 have elongated openings 27$^A$ to afford tightening of the belt conveyors 16 by longitudinal adjustment of the bars 27 relatively to the troughs and bolts 28.

The ends of the bars 27 carry looped straps 29 which constitute shoes on which the ends of the conveyor troughs are supported as the shoes slide over the ground. Each shoe 29 consists of a bent metallic strap having ends secured to the bars 27 by a common securing bolt 30.

The drive shafts 20 to which the discharge end rollers 18 are fixedly secured, are supported on ball bearings in housings 31 mounted on the bars 32 which are supported on the lower ends of bars 33 and 34.

The bar 33 is supported near its upper end on bar 35 which extends rearwardly and downwardly for support on the spaced bars 36 of the front bumper and the lower end of bar 35 is riveted to plate 37 the upper end of which is riveted to the drive-supporting plate 38 and the other end of which is extended as a guard and connected to the outer bar 32. The bar 33 also supports the ridge of the angularly disposed plate 39 the rear side portions of which overlap the edges of the angularly cut ends of the walls 19$^D$ to thereby deflect the flying insects to the walls 19$^D$ from the blower and drive mechanism disposed behind the deflecting plate 39.

As shown in Figs. 5 and 6, the insect-engaging plate walls 19$^D$ are curved upwardly from the conveyor rear wall portion 19$^C$ up to where such walls 19$^D$ are extended substantially vertically to their upper edges which are reenforced with a lateral bar 69. As the apparatus is moved over the ground the insects such as grasshoppers will as a result of the movement of the apparatus and through the additional agitation of the grass or the like by the resilient agitators 58, rise in flight to be engaged by the walls 19$^D$ with sufficient force to cause the insects to slide down the vertical and curved sections of the walls 19$^D$ onto the trough belt conveyors to be discharged into the open mouth 49$^A$ of the suction spout 49 and through the blower into the bag 50.

In order to insure a maximum catch of such insects, I prefer to provide curved screen extensions 70 at the upper edges of the plates 19$^D$, since in practice the height of the walls 19$^D$ is only preferably 24 to 30 inches and some of such insects may not be so engaged as to slide down the plates 19$^D$, and therefore, in order to trap and engage such insects which might be forcibly projected over the top of plates 19$^D$, the curved screens 70 will engage same with the result that a large number of the insects will then fall downwardly against the plates 19$^D$ and onto the conveyors.

The semi-circular section of the screens 70 is suitably secured to the spaced bars 69 and 72 which are retained in spaced position by spaced channels 71.

In order to further increase the yield of insects, the apparatus may be provided with an upwardly extending wall section of wire screen 73 having its lower side secured to bar 72 and its upper end fixed to bar 74 supported by spaced bar braces 75 which are connected to bars 74 and 69.

The walls 73 and curved sections 70 are preferably made of wire screen material to reduce wind resistance and to lighten the weight of the apparatus.

The plate 38 is fixed at its rear side to a pair of spaced cross bars 40 connected at their ends to the automobile frame members 13 and the front end of plate 38 is bent upwardly and connected to the lower bar 36 of the front bumper.

The forward end of the crank shaft 41 is suitably connected to the main drive shaft 42 which is supported on bearings 43 fixed to plate 38. A pair of pulleys 44 is fixed to shaft 42 and these pulleys 44 are connected by drive belts 45 to a pair of pulleys 46 fixed to the blower shaft 47.

The suction inlet of the blower 48 is connected to the spout 49 which extends downwardly and then laterally under the discharge ends of the conveyors 16. The lateral end 49$^A$ of the spout is open to form a receiving trough-like inlet into which the insects are discharged and by the suction of the blower 48 drawn into the spout 49 for discharge through the blower discharge end 48$^A$ into a suitable receiving container, as for example, a fabric bag 50 suitably secured onto the discharge end 48$^A$.

To the forward end of the drive shaft 42 is fixed the drive pulley 51. To the ends of the conveyor drive shafts 20 I fix drive pulleys 52 and 53. An endless drive belt 54 is trained over the top of drive pulley 51 and around the conveyor drive pulleys 52 and 53 and over the top of the belt tightener pulley 55 which is suitably journaled at the top of the bar 56 having elongated holes adapted to receive bolts 57 extending through the front bumper bars 36.

The blower 48 is supported in proper elevated position in plate 59 the lower ends of which are riveted to plate 38.

Since the conveyors 16 and the troughs 19 are disposed for clearance purposes above the top of the ground, I prefer to provide spaced resilient agitators 58 which are made of light flexible spring steel bars, shaped as shown in Figs. 2, 3 and 10 and the ends of which are secured together to the stiffener bolts 22 at the front side of the conveyor housing troughs.

The apparatus is somewhat stiffened in a lateral direction at its ends by means of rods 60 having turnbuckles 61 for adjustment thereof. The front ends of the rods 60 are hooked in eyebars 62 secured to the end of the conveyor troughs, see Fig. 4, and the rear ends are hooked into eye-clamps 63 which are clamped to the automobile front fenders 12 as shown in Fig. 1. This arrangement provides sufficient lateral stiffness to the conveyor ends and still permits sufficient play for the conveyor ends to move up and down as the apparatus moves over a field to catch the flying insects.

Since the conveyors and the walls engaged by the flying insects comprise sections pivotally mounted about the conveyor drive shafts 20, the sections are therefore movable upwardly to a limited extent to provide the necessary flexibility in riding on the end-supporting resilient shoes 29 over uneven ground but to limit the downward movement of the conveyor outer ends beyond the desired horizontal alignment of the two conveyor sections, I provide a pair of supporting chains 64. One end of each chain 64 is fixed to the outer end of bar 69, which is shown in cross-section in Fig. 5, and the other end is adjustably secured to a hook 66 at the end of the horizontal elevated bar 67 which is supported on a pair of spaced upright bars 68 secured near the ends of the two bars 36 of the front bumper 15 as shown in Figs.

1, 2 and 5. This arrangement of chains 64 insures free up and down movement of the ends of the conveyor sections within planes above the lowermost positions of the conveyor ends when both conveyors are substantially longitudinally aligned and such chains also afford limited lifting of the ends of the two conveyor sections upwardly into tilted positions about the conveyor drive shaft centers to thereby slightly decrease the lateral distance between the ends of the two sections to permit passage of the apparatus through farm gates of a width which might not permit passage of the apparatus in operative position.

It is obvious that various changes and modifications will become readily apparent upon perusal of the above specifications and drawings which disclose one embodiment of my invention. Some of such modifications may include the substitution of a single conveyor 16 and single engaging wall 19D for the double unit shown herein, or a suitable drag conveyor could be substituted for the suction apparatus to receive the insects from the discharge ends of the two conveyors 16 and discharge same into a suitable receiver. I therefore, do not wish to be understood as limiting myself to the exact details of construction and arrangement shown herein for purposes of illustrating an embodiment of the spirit of my invention which is defined in the appended claims.

I claim:

1. Insect catching apparatus comprising a power-propelled vehicle having a motor thereon, a laterally disposed trough supported at one end of said vehicle, a conveyor in said trough, resilient shoes for supporting said trough and conveyor on the ground over which the vehicle is propelled, a wall extending upwardly from said trough adapted to engage insects in their flight and to fend the insects into said trough onto said conveyor, a receiver, means at the end of said conveyor for discharging the insects into said receiver, and means for operatively connecting said conveyor with said motor on the vehicle.

2. The combination with a power-propelled vehicle having a motor thereon, of insect catching apparatus including a pair of laterally aligned upwardly extending walls adapted to engage insects in their flight and to fend the insects downwardly, a conveyor at the lower end of each of said walls, each of said conveyors and its cooperative wall being pivotally mounted at one end at the front end of the vehicle to permit limited vertical movement, resilient shoes adapted to support the opposite ends of the conveyors, receiving means, means for discharging the insects from said conveyors into said receiving means, and means for operatively connecting said conveyors with the motor on the vehicle.

3. An insect catching apparatus comprising a power-propelled vehicle having a motor thereon, a pair of aligned troughs extending transversely to the longitudinal axis of the vehicle, a belt conveyor in each of said troughs, said conveyor belts being movable to convey insects toward one another to a common centrally disposed discharge end, means connected to the discharge ends of said conveyors for propelling the belts, an upwardly disposed wall for each of said troughs adapted to engage insects in their flight and to fend the insects into said troughs onto said conveyor belts, said walls being movable vertically as a unit with the troughs and their conveyors and being curved at their lower ends above the troughs, said walls and troughs and conveyors being pivotally mounted at the conveyor discharge ends, resilient means for supporting the outer ends of said conveyor troughs to permit limited vertical movement of said units relatively one to the other, means for receiving and captivating the insects, and means at the discharge ends of said conveyors for discharging the insects into said receiving means.

4. Insect catching apparatus as embodied in claim 3 and including said means for propelling the conveyor belts including means for operatively connecting same to said motor on the vehicle.

5. Insect catching apparatus as embodied in claim 3 and including said insect-engaging walls of sheet metal and wire screen extensions above said walls to increase the area of insect-engaging surface.

6. Insect catching apparatus as embodied in claim 3 and including said insect-engaging walls of sheet metal, vertical wire screens above said sheet metal walls, and a curved screen of semi-circular cross-section having one side adjacent to the top of the sheet metal wall and its opposite side adjacent to the lower end of said vertical wire screen.

7. Insect catching apparatus as embodied in claim 3 and including said means at the discharge ends of said conveyors comprising a suction fan and a pipe having one end connected to the air inlet of said fan and its opposite end disposed at the trough conveyor discharge ends.

8. Insect catching apparatus as embodied in claim 3 and including adjustable flexible means for supporting the outer ends of said units permitting automatic upward movement of the outer ends of said units responsively to the ground contours over which said units are moved, and means for bracing said outer ends of said units against lateral displacement as to longitudinal alignment but permitting limited vertical movement of the ends.

FRED W. GRABE.